A. S. LYMAN.
Fruit Can.
No. 20,722. Patented June 29, 1858.
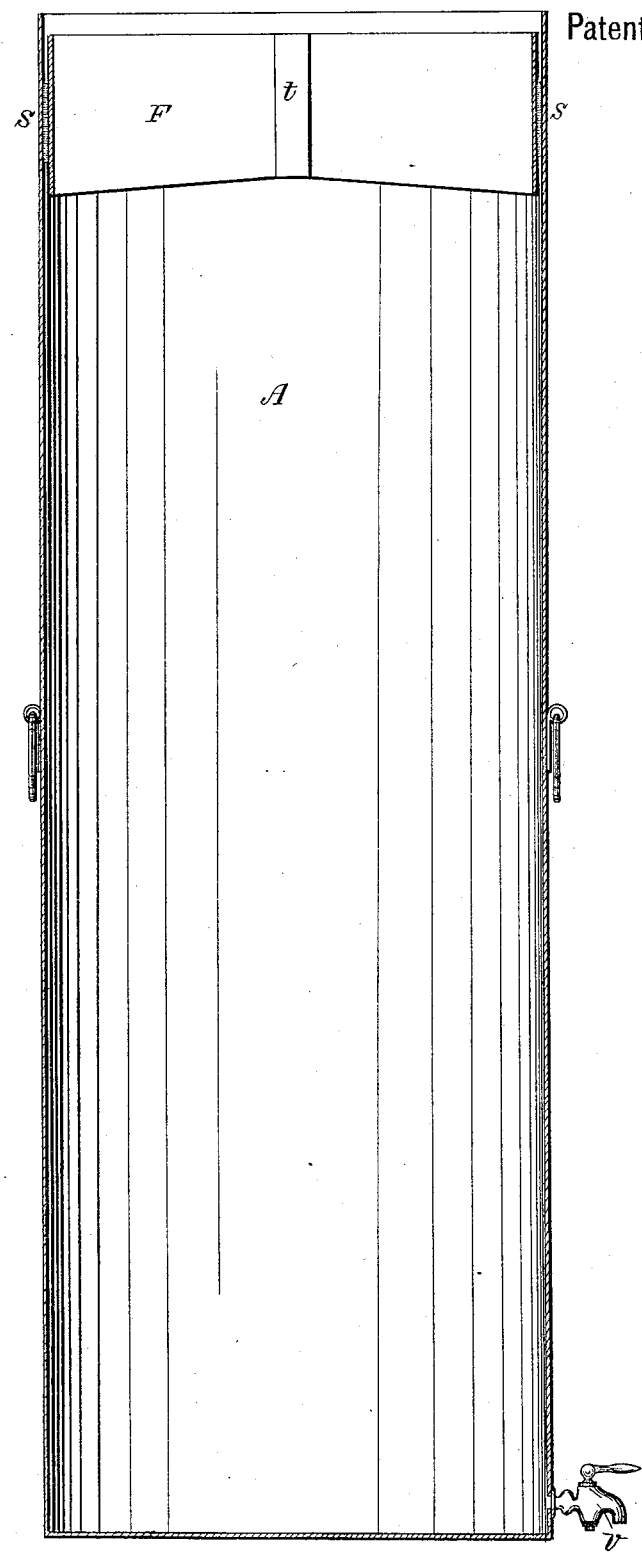

UNITED STATES PATENT OFFICE.

A. S. LYMAN, OF NEW YORK, N. Y.

IMPROVEMENT IN CANS FOR PRESERVING FOOD, &c.

Specification forming part of Letters Patent No. 20,722, dated June 29, 1858.

*To all whom it may concern:*

Be it known that I, A. S. LYMAN, of the city, county, and State of New York, have invented certain new and useful Improvements in Cans for Preserving various Articles of Food, &c.; and I do hereby declare that the following is a full and exact description of the same, reference being made to the accompanying drawings, making a part of this specification.

A represents a vertical section of the can, which generally consists of a cylinder holding from five to thirty gallons.

F represents the float, made of such size that it shall fall freely and without friction on the sides of the can, and of such weight that it shall sink about two-thirds of its depth into the liquid to be preserved.

S S, the red lines around the float, represent oil between the float and the sides of the can.

$t$ represents a tube, which answers the purpose of a handle to the float, and from which the air under the float escapes.

$v$ represents the valve for drawing off the material from the can.

When the food to be preserved is sufficiently heated, I drop in the float and turn into the narrow space between it and the sides of the can about an inch in depth of some oil not liable to become rancid. The bottom of the float is made concave, so that if any oil rises from the substance to be preserved it shall be gathered under the float, and not come in contact with the oil around it. The tube $t$ is also filled with melted tallow or other suitable substance.

Operation: It will be readily perceived that the float sinks in this can as fast as the material is drawn off by the valve $v$, and that the food is as effectually preserved by the float and its oil-joint from the air as in the hermetically-sealed can. Instead of a vacuum, the pressure of the liquid on its inner surface is greater than that of the atmosphere on its outer surface. There is here no injurious strain on the can or tendency to collapse or to force leaks, caused by the pressure of the atmosphere, and we may draw off small quantities—no more, no less, than we wish—and whenever we wish to use it every day in the month from a large can without exposing the remainder to the causes of decomposition.

A twenty-five gallon can of this kind is also much cheaper than a sufficient number—that is, one hundred or two hundred—of quart or pint cans to hold the same amount.

What I claim as new, and desire to secure by Letters Patent, is—

The employment of the float surrounded by the protecting-liquid, in combination with a vessel having an arrangement for discharging its contents, substantially as described, for the purposes specified.

A. S. LYMAN.

Witnesses:
    J. W. POST,
    WM. T. LYMAN.